US010830165B2

(12) United States Patent
Tombari et al.

(10) Patent No.: US 10,830,165 B2
(45) Date of Patent: Nov. 10, 2020

(54) IDENTIFICATION AND SUPPRESSION SYSTEM OF A TORQUE DELIVERY IMBALANCE OF AN INTERNAL COMBUSTION ENGINE EQUIPPED WITH TWO OR MORE CYLINDERS

(71) Applicant: FERRARI S.p.A., Modena (IT)

(72) Inventors: Lorenzo Tombari, Modena (IT); Giovanni Sartoni, Ozzano Dell'Emilia (IT); Daniele Genova, Modena (IT)

(73) Assignee: FERRARI S.P.A., Modena (IT)

( * ) Notice: Subject to any disclaimer, the term of this patent is extended or adjusted under 35 U.S.C. 154(b) by 22 days.

(21) Appl. No.: 16/248,212

(22) Filed: Jan. 15, 2019

(65) Prior Publication Data

US 2019/0218982 A1 Jul. 18, 2019

(30) Foreign Application Priority Data

Jan. 16, 2018 (IT) ........................ 102018000001107

(51) Int. Cl.

| | |
|---|---|
| ***G06F 1/00*** | (2006.01) |
| ***F02D 41/00*** | (2006.01) |
| ***F02D 41/14*** | (2006.01) |
| ***F02D 41/22*** | (2006.01) |
| ***F02N 11/08*** | (2006.01) |
| *F02D 41/28* | (2006.01) |

(52) U.S. Cl.

CPC ..... *F02D 41/0085* (2013.01); *F02D 41/0052* (2013.01); *F02D 41/1498* (2013.01); *F02D 41/22* (2013.01); *F02N 11/0833* (2013.01); *F02D 2041/288* (2013.01); *F02D 2200/101* (2013.01)

(58) Field of Classification Search

CPC .... F02D 19/025; F02D 19/0623; F02D 41/22; F02D 2041/2086; F02D 41/12; F02D 2041/226; F01L 2710/006

USPC ................. 701/101, 110, 111, 114; 123/436, 123/406.23, 351, 352

See application file for complete search history.

(56) References Cited

U.S. PATENT DOCUMENTS 4,301,678 A * 11/1981 Full .................... G01M 15/044 702/44
2002/0148441 A1 10/2002 Tuken
2003/0089338 A1 5/2003 Remele et al.
2005/0229904 A1 10/2005 Hagel et al.
2007/0175443 A1 8/2007 Schueler
(Continued)

FOREIGN PATENT DOCUMENTS

EP 2843219 A1 3/2015

OTHER PUBLICATIONS

Search Report for IT Application No. 2018000001107, search completed Sep. 7, 2018 (8 pages).

*Primary Examiner* — John Kwon
(74) *Attorney, Agent, or Firm* — Cantor Colburn LLP

(57) ABSTRACT

Method for the identification of a torque delivery imbalance of an internal combustion engine equipped with two or more cylinders under constant speed operating conditions of the internal combustion engine comprising an analysis procedure in the frequency domain of a rotation speed signal of said engine so that when an amplitude of a half-order frequency exceeds a predetermined threshold, the cylinder of said two or more cylinders that causes said imbalance is identified by calculating a relative phase.

22 Claims, 5 Drawing Sheets

(56) References Cited

U.S. PATENT DOCUMENTS

| | | | | |
|---|---|---|---|---|
| 2008/0276697 | A1 | 11/2008 | Ostman | |
| 2009/0037060 | A1* | 2/2009 | Carlhammar | B60W 10/11 701/54 |
| 2010/0039076 | A1* | 2/2010 | Trainer | H02P 9/102 322/58 |
| 2014/0347043 | A1* | 11/2014 | Chana | G01M 13/021 324/242 |
| 2017/0122839 | A1* | 5/2017 | Stola | G01B 21/22 |
| 2017/0241369 | A1* | 8/2017 | Jammoussi | F02B 75/18 |
| 2017/0254726 | A1 | 9/2017 | Das et al. | |
| 2020/0040988 | A1* | 2/2020 | Duan | B60W 10/10 |

* cited by examiner

IDENTIFICATION AND SUPPRESSION SYSTEM OF A TORQUE DELIVERY IMBALANCE OF AN INTERNAL COMBUSTION ENGINE EQUIPPED WITH TWO OR MORE CYLINDERS

CROSS-REFERENCE TO RELATED APPLICATIONS

This Patent application claims priority from Italian Patent Application No. 102018000001107 filed on Jan. 16, 2018, the entire disclosure of which is incorporated herein by reference.

FIELD OF APPLICATION OF THE INVENTION

The present invention relates to the field of methods and systems for the identification of disturbances and for the consequent control of the internal engine to suppress such disturbances.

STATE OF THE ART

Internal combustion engines include one or more pistons associated with as many cylinders. The relative reciprocating motion is transformed into a rotary motion by means of a known crank mechanism.

Given a predetermined engine capacity, an advantage of fractioning said capacity is the easy balancing of the alternating and rotating masses.

The disadvantage of a multi-cylinder engine obviously lies in the higher cost.

With respect to this cost, it is important to ensure an optimum engine balancing under operating conditions, especially when the engine includes six or more cylinders and is intended for a prestigious as well as a sporty vehicle.

The internal combustion engine balancing depends on several factors:

- low manufacturing tolerances of the relative components, from the crank mechanisms to the valves to the fuel injectors;
- engine assembling ability,
- combustion control system of each cylinder.

An efficient balancing of an internal combustion engine also allows reducing the vibrations it transmits to the relative supports that connect the internal combustion engine to the body of the vehicle and to the transmission.

A lower intensity of the vibrations allows reducing or simplifying the flywheel with an overall reduction of the mass of the vehicle. This reduction, in turn, saves fuel and improves the vehicle performance.

SUMMARY OF THE INVENTION

The object of the present invention is to provide a balancing system designed to compensate or at least reduce any imbalances in the rotation of an internal combustion engine equipped with a plurality of cylinders.

The basic idea of the present invention is to detect an imbalance of the torque delivered by a single cylinder with respect to the remaining cylinders by means of a frequency analysis of a first signal representative of the rotation speed of the drive shaft when this speed is substantially constant. In particular, said first signal is converted into a corresponding signal in the frequency domain and a predetermined frequency band is identified. When the amplitude of said second signal in said predetermined frequency band exceeds a predetermined threshold, then a phase of said second signal is calculated in said second predetermined band.

This identification is carried out so as to save only the half-order frequency, namely the one obtained for a frequency equal to half the nominal frequency corresponding to the rotation speed of the drive shaft.

In other words, only a so-called band pass filter tuned to the half-order frequency can be used.

This phase identifies a specific cylinder that causes said imbalance, namely that introduces a disturbance.

It is clear that when it is stated that the speed of the engine is substantially constant this is true with the exception of the unavoidable imbalances due to the crank mechanisms and of the possible presence of a disturbance caused by a cylinder.

When there is a positive ignition engine, one or more strategies for correcting said imbalance or disturbance might be implemented by varying the ignition advance of one or more cylinders.

On the other hand, when the engine is a diesel cycle engine, it is not possible to intervene on the advances, since the ignition of the mixture is spontaneous, but it is possible to intervene on the supply of one or more cylinders of the internal combustion engine.

Thanks to the present invention, it is possible to obtain a better balance of the internal combustion engine, bringing said amplitude of said second signal back into said predetermined band below said predetermined threshold.

The engine rpm signal is generally present in the engine control unit, therefore no variation of the existing hardware is required.

Moreover, the method object of the present invention can advantageously be implemented in a processing unit designed to control the internal combustion engine modified/programmed to be a further object of the present invention.

The claims describe preferred variants of the invention forming an integral part of the present description.

BRIEF DESCRIPTION OF THE FIGURES

Further objects and advantages of the present invention will become clear from the following detailed description of an embodiment thereof (and of its variants) and from the annexed drawings, given purely by way of an illustrating and non-limiting example, in which.

The same reference numbers and letters in the figures identify the same elements or components.

In the present description, the term "second" component does not imply the presence of a "first" component. These terms are in fact used only for clarity's sake and are not to be meant in a restrictive way.

DETAILED DESCRIPTION OF EMBODIMENTS

Figure 4:
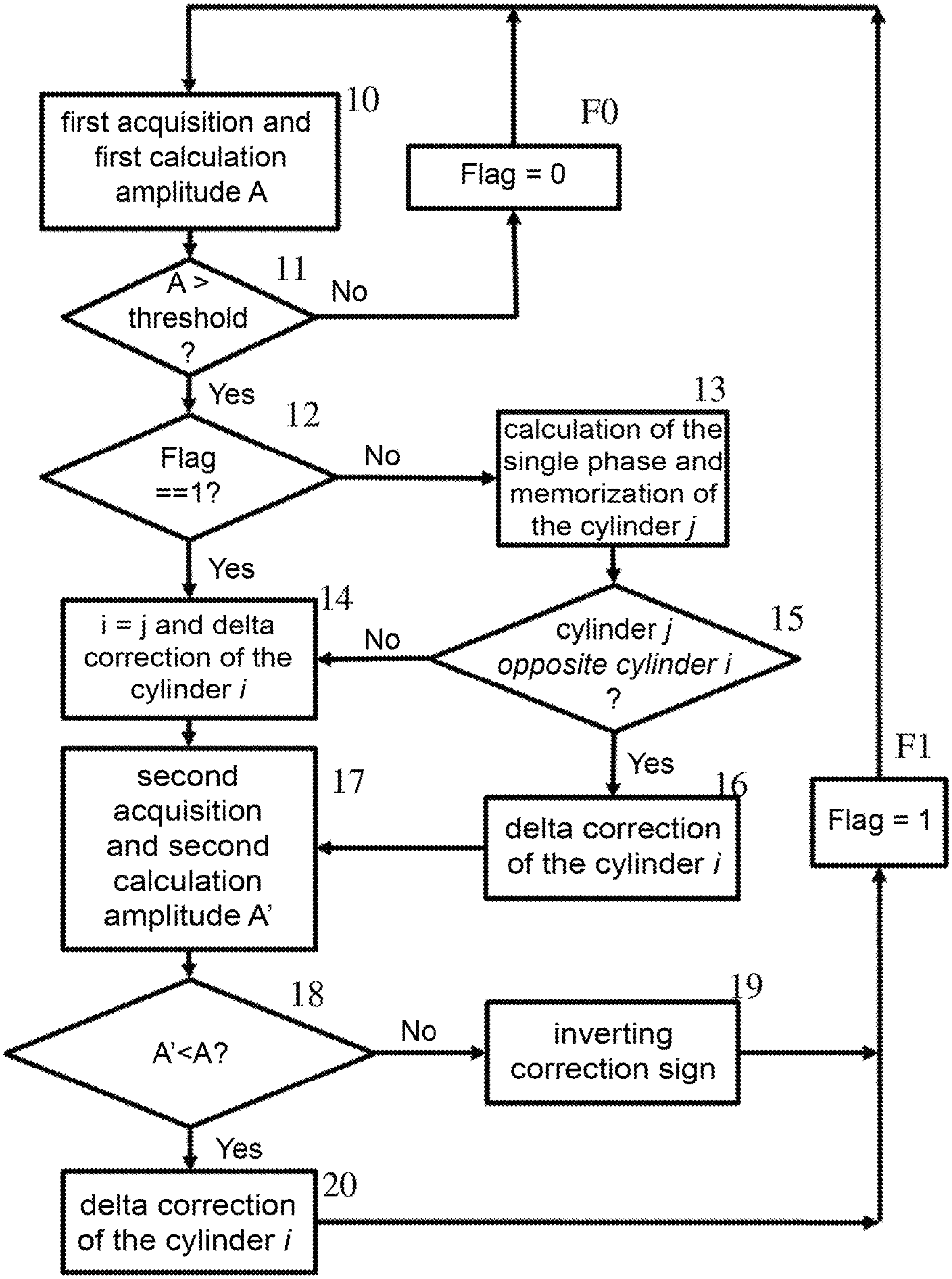
FIG. 4 shows a flowchart representative of a first preferred variant of a control method based on the present invention.

According to the present invention, the internal combustion engine comprises a plurality of cylinders. For example, FIGS. 4 and 5 show only the first four cylinders 1 to 4 of a first bank of an engine comprising two V-shaped banks with a total of eight cylinders.

The cylinders are connected to a single drive shaft CS to which a so-called phonic wheel is rigidly associated, to which a sensor S is in turn associated that is able to measure an (angular) speed of the drive shaft. Generally, it uses the Hall effect, but other technologies can be used.

Figure 5:
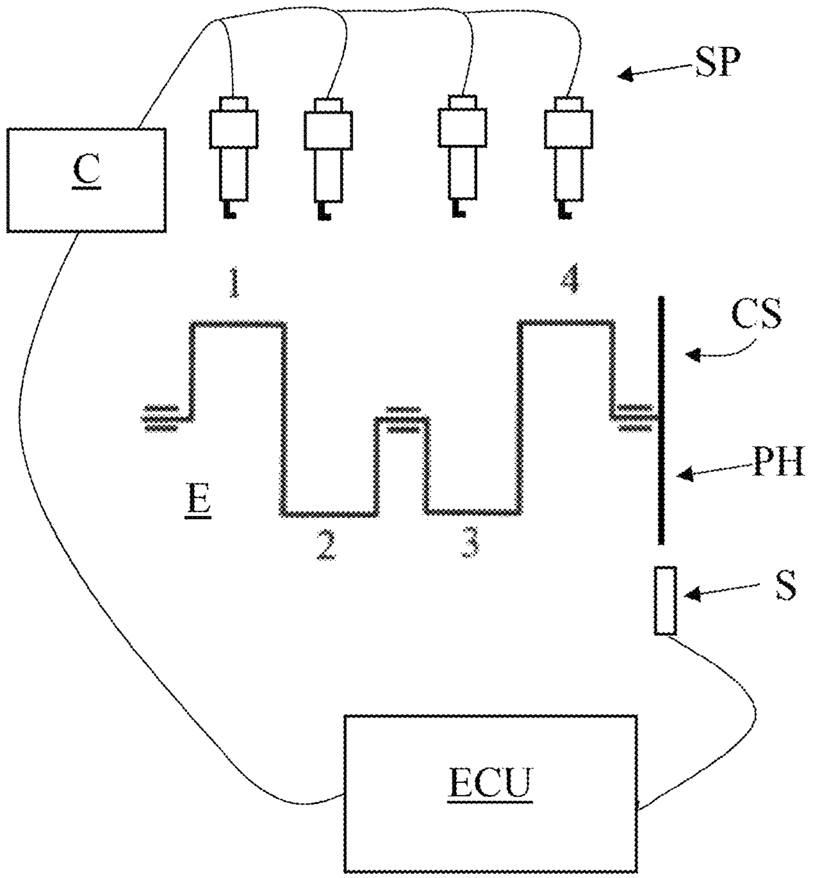
FIG. 5 shows a preferred implementation of the present invention in the context of a positive ignition internal combustion engine.

FIG. 5 shows a positive ignition internal combustion engine showing the SP spark plugs that cause the air/fuel mixture to ignite in a corresponding cylinder 1-4.

Figure 6:
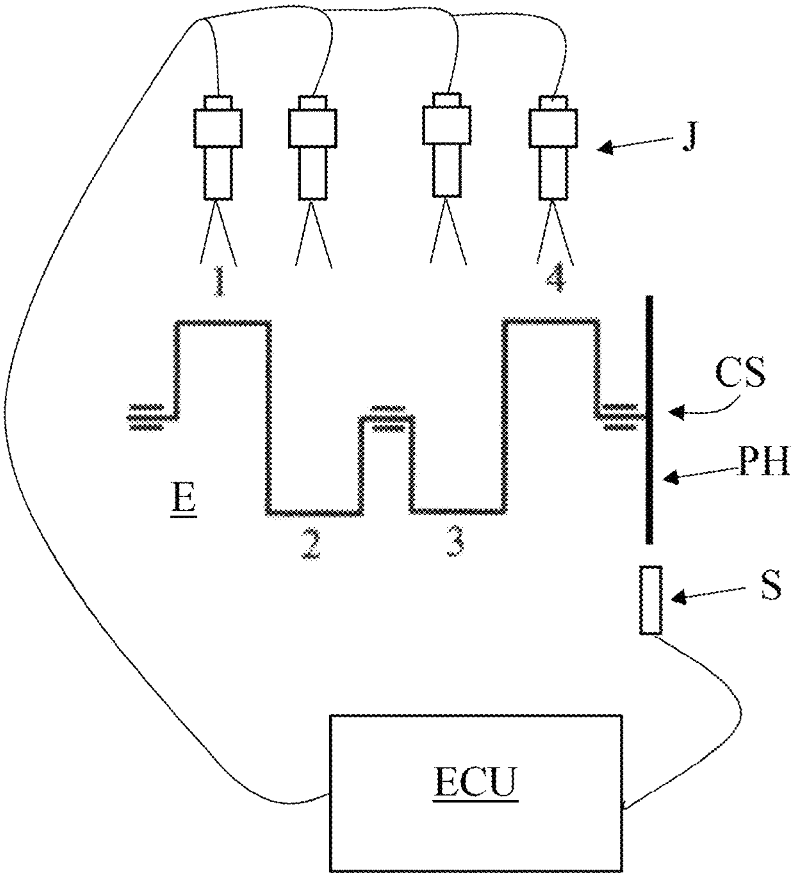
FIG. 6 shows a preferred implementation of the present invention in the context of a diesel cycle internal combustion engine.

FIG. 6 shows a diesel cycle internal combustion engine showing the diesel fuel injectors J that inject the fuel into a corresponding cylinder 1-4.

An ECU (Engine Control Unit) processing unit is operatively connected to said angular speed sensor S.

Disturbance Detection

The processing unit is programmed to acquire the signal generated by said sensor and to convert it into a signal in the frequency domain, for example by the Fourier transform.

They are preferably processed acquisition ranges of said signal in which the same signal is averagely constant.

A first ideal analysis condition can coincide with the idle condition of the internal combustion engine.

Other ideal conditions can be identified when the angular speed of the drive shaft is averagely constant over a predetermined time range, for example, when the vehicle is traveling at a constant speed.

A nominal frequency is defined based on the average angular rotation speed of the drive shaft, for example, 850 rpm corresponds to a nominal frequency of 14.17 Hz.

It is defined as "half-order frequency" that frequency corresponding to half the nominal frequency, e.g. $14.17/2=7.08\approx7$ Hz. It is sometimes called "half-order harmonic".

Figure 1:
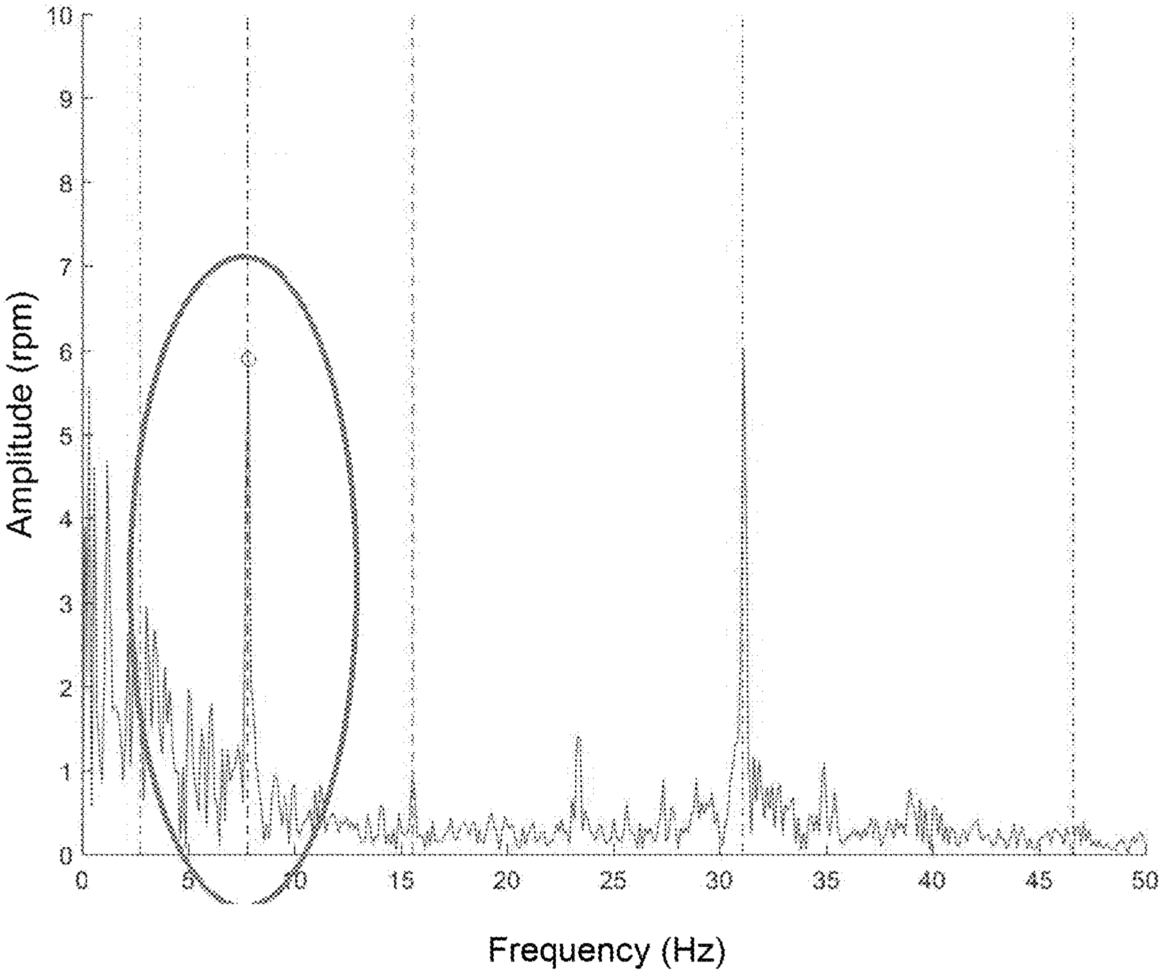
FIG. 1 shows a signal in the frequency domain corresponding to a signal representative of a rotation speed of a drive shaft of an internal combustion engine.
Figure 3:
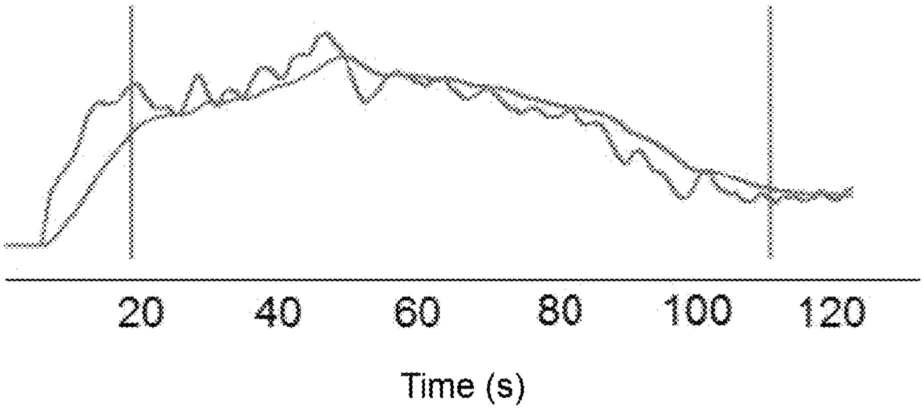
FIG. 3 shows a time curve representing an amplitude measured in a predetermined frequency band of FIG. 1.

Examples of frequency analysis of the angular speed of the internal combustion engine are given in FIGS. 1 and 3.

According to the present invention, the signal in the frequency domain is analysed, preferably by the Fourier transform, at said half-order frequency.

When the amplitude of the half-order frequency exceeds a predetermined settable threshold Th, then an imbalance condition of the internal combustion engine is detected.

It is therefore necessary to identify the cylinder causing this imbalance.

It is known that the Fourier transform is a function of the time domain with values in the complex plane. Therefore, it is possible to calculate the so-called phase spectrum of the function as arctan (Im(f)Re(f)) and in particular the phase fi(f) of the disturbance by substituting said half-order frequency to the variable f, e.g. 7 Hz if the engine is idling.

Once obtained a phase value according to the present invention, said phase is correlated with the cylinder causing this imbalance. In this regard, the plan is divided first into contiguous angular sectors numbered according to the same ignition sequence of the cylinders starting from a reference phase f (0), indicated in the Figure by the axis 0. An example is given in FIG. 2. Therefore, a 1:1 relationship is defined between the angular sectors and all the cylinders composing the internal combustion engine.

Starting from said reference axis, the cylinder i is identified as the cause of this imbalance, which is the one whose angular sector comprises the aforesaid phase fi (f/2).

Preferably, the cylinder is identified when a counter exceeds a settable threshold, i.e. when the phase is stable after a predetermined number of iterations. This counter is reset every time the phase changes angular sector: in this way the identification takes place only after a sufficiently long time in order to reliably associate the calculated phase with the cylinder i.

If the operating parameters of the cylinders are identical for all the cylinders, i.e. if no previous correction has been made, then the procedure for the identification of the cylinder causing the aforesaid disturbance is considered terminated.

If, on the other hand, the engine operating parameters have been altered by a previous disturbance detection procedure followed by a disturbance suppression procedure, then it is possible to proceed in two ways:

a) the previous corrections are cancelled and the disturbance monitoring is restarted, or
b) it is identified the cylinder j that is currently causing the disturbance. If the cylinder j corresponds to the angular sector opposite the one previously associated with the cylinder i, then the cause of the disturbance is considered the same disturbance suppression strategy implemented on the previously corrected cylinder i, otherwise the cylinder j is considered the cause of the new disturbance.

Then a (new) disturbance correction procedure or a new reset procedure of any disturbance correction in progress can be started.

From what described above, it is clear that the initial problem may spontaneously end, e.g. due to impurities in the fuel that selectively hit a cylinder.

In such circumstances, a possible suppression strategy can cause a disturbance with an increase in the amplitude of the half-order frequency associated with a cylinder, which delivers, for example, more torque than the remaining cylinders.

Figure 2:
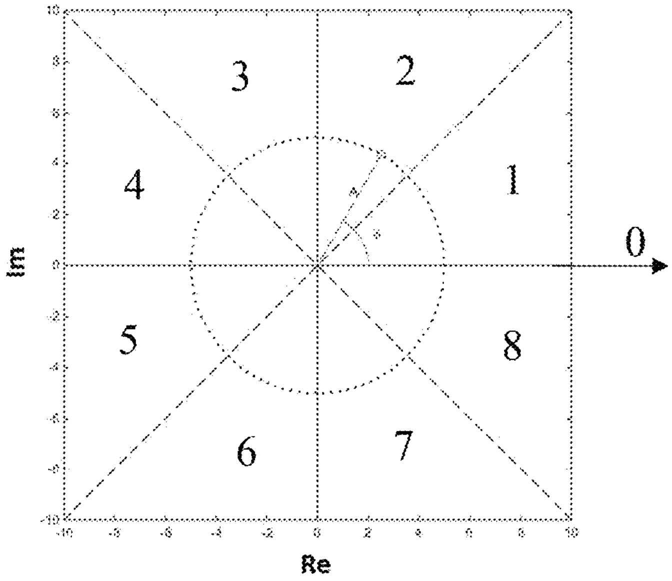
FIG. 2 shows an even subdivision of the plane in as many angular sectors as the cylinders of the internal combustion engine of FIG. 1.

It has been observed that this results in a disturbance given by the cylinder opposite the i-th cylinder, in the phase diagram shown in FIG. 2, which is called the j-th cylinder. "Opposite", in a circular diagram, evidently refers to the origin of the same circular diagram. By definition, a first phase is opposite another if they differ by 180°.

If a previous correction made on the cylinder i were not taken into account, the procedure would then correct the torque delivered by the cylinder j. This might lead to the suppression of the imbalance, but it is however preferable to operate again on the cylinder i to guarantee an even distribution of the torque delivered by all the cylinders, i.e. avoiding that the cylinders i and j deliver a torque different from the one delivered by the others cylinders.

The second option b) is advantageous because it allows obtaining a quicker correction starting from the last correction carried out following the detection of the cylinder i as a cause of disturbance.

In short, the method for the identification of a torque delivery imbalance of an internal combustion engine equipped with two or more cylinders under constant speed operating conditions according to the present invention comprises in succession the following steps:

(i) acquiring a first signal of a rotation speed of a relative drive shaft (CS) by means of a speed sensor;
(ii) converting said first signal into a second signal in the frequency domain, (iia) calculating a first amplitude (A=Re(f/2)) of a predetermined frequency (f/2) equal to half a frequency (f) relative to said averagely constant speed;

(iii) comparing said first amplitude (A) with a predetermined threshold (Th) and if said first amplitude exceeds said predetermined threshold, then (iv) an imbalance of the internal combustion engine has been identified.

Subsequently, to detect the cylinder causing the imbalance, possibly to correct it or for a subsequent statistical processing, the following steps are carried out in succession:

(iib) calculating a first phase (fi(f/2)) relative to a first amplitude (Re(f/2)) with respect to a reference phase (f(0));

(v) preliminary dividing a plane into angular sectors in numbers corresponding to a number (N) of said two or more cylinders and numbering said sectors consecutively according to an ignition order of said internal combustion engine starting from a reference phase (0);

(vi) identifying said first cylinder (i) that causes said imbalance by identifying a corresponding sector (i) to which said first phase (fi(f/2)) belongs.

Disturbance Suppression

Based on the type of internal combustion engine, the ECU processing unit can intervene on an operating parameter of a cylinder:

on the ignition advance, in the case of a positive ignition internal combustion engine, on the fuel injection, in the case of a self-ignition, i.e. a diesel cycle internal combustion engine.

When the internal combustion engine is a positive ignition internal combustion engine and includes a post-treatment system of the exhausted gas allowing a lean combustion (lambda higher than 1), then either of the two or both of the previous strategies can be used in combination with each other.

The concept of ignition advance is known to the person skilled in the art and refers to reaching the PMS piston.

With regard to fuel injection, the timing of fuel injections and/or the total mass injected in each combustion cycle may be varied.

The effected correction aims at obtaining a variation of the torque delivered by a cylinder that is judged to be the cause of the disturbance. Said variation is made in a discrete manner, namely with predetermined and adjustable amplitude corrections of an operating parameter of said cylinder.

The amplitude of the half-order frequency is monitored regardless of the type of correction carried out. This provides a feedback on the exactness of the correction. If the amplitude is reduced, then the correction sign is correct, otherwise the correction sign is inverted until its amplitude is lower than said predetermined settable threshold Th. Therefore, the present suppression method is a closed loop control method.

In particular, it is acquired a first trend of said amplitude or a parameter representing it in a time range preceding a correction, then said correction is applied and it is acquired a second trend of said amplitude or a parameter representing it in a time range following said correction and comparing said first and second trends or the corresponding parameters. In particular, the amplitudes or the integrals of the trends are compared.

Therefore, according to the present invention, a disturbance suppression introduced by the previously identified cylinder is corrected by means of one of the following steps:

(ixa) a first correction of an operating parameter of said first cylinder, or (ixb) a second correction of an operating parameter of a second cylinder (j) opposite said first cylinder, or (ixc) a third correction of an operating parameter of the remaining cylinders with respect to said first cylinder.

Preferably, the method is performed in closed loop and therefore also the following steps are carried out in succession:

(xi) acquiring a second signal of said rotation speed of a relative drive shaft (CS) by means of a speed sensor;

(xii) converting said second signal into a second signal in the frequency domain, (xiia) calculating a second amplitude (A'=Re(f/2)) of said predetermined frequency;

(xiii) comparing said first amplitude with said second amplitude and if said second amplitude exceeds said first amplitude, then (xiv) inverting a sign of said correction and carrying out said first, second or third correction of said parameter according to any one of the possible aforesaid options ixa, ixb, ixc, or, if said first amplitude exceeds said second amplitude, then (ix) correcting said parameter according to one of said aforesaid options without obviously varying the sign previously used for the previous correction.

It is clear that the correction is made in a recursive manner. Therefore, it is preferable that, if two consecutive inversions of the correction sign are obtained, then the algorithm can stall and it is preferable to reset any correction and restart from the beginning.

To reset any correction means referring to a set of reference parameters (set-point).

Based on the result of the comparison of the amplitudes related to the first range and to the second range, the correction continues by using the same correction sign or by inverting the correction sign until the amplitude of the half-order frequency is again below the threshold Th.

In other words, if the correction reduces the amplitude of the disturbance, it continues without inverting the correction sign, otherwise the sign is inverted and the correction is continued until the amplitude of the half-order frequency is reduced below the threshold Th.

According to a preferred variant of the disturbance suppression method, said first trend is low pass filtered in order to identify an improving or worsening trend of the correction action carried out with respect to the first trend acquired before the correction.

FIG. 3 shows two overlapping curves. The more jagged one identifies said second trend, while the filtered, more smoothed one identifies the first signal. Their overlapping shows that the correction tends to limit the amplitude of the second trend with a correction made with the correct sign.

A similar comparison can be made by comparing the integrals of said first and second trends. Preferably, said integrals are obtained after the low pass filtering of both trends.

Later, various disturbance suppression techniques are described that operate on the only cylinder identified as disturbing and/or on the remaining cylinders.

In any case, the disturbance suppression provides a correction (ixa) of the torque delivered by said cylinder i and/or a correction (ixb, ixc) of the torque delivered by the remaining cylinders.

This torque correction can be positive or negative.

It is clear that, in the event of a disturbance correction, in order to decide to operate on the opposite cylinder or on the remaining cylinders rather than on the one identified by means of the aforesaid identification procedure, it is advisable to memorize (x) by relating the following information:

- the index of the cylinder (i-mo) object of the last correction;
- which correction has been made on the same cylinder or on the opposite one and/or on the remaining cylinders (ixa, ixb, ixc);
- said sign of said last correction.

So, if it turns out that the identified cylinder is the one that had been previously corrected, its correction is reduced. In other words, a relative operating parameter is further corrected by starting the procedure with the inversion (xiv) of the sign of the last correction.

Once the amplitude of the disturbance has fallen below the threshold, the suppression procedure ends, maintaining the last correction, while the monitoring of the amplitude of the half-order frequency can continue.

It may happen that the causes that generated an imbalance end while a suppression strategy is still active.

In this case, it should be checked whether the cylinder causing the disturbance is not the cylinder opposite—in terms of angular sector—a cylinder that had been previously corrected. In this case, it is preferred, as described above, to operate on the cylinder that had been previously corrected by gradually reducing the correction previously made to a related control parameter.

FIG. 4*a* proposes a flowchart of an example of a preferred implementation of the present invention by implementing the detection of an imbalance, the identification of the cylinder that causes this imbalance as well as the relative suppression by taking into account any previous suppression:

- (step 10) (iia) first acquisition of a first time sample of the rotation speed signal of the drive shaft and first calculation of a first amplitude A of the half-order disturbance;
- (step 11) (iii) comparing said amplitude with a predetermined threshold (Th) and if said amplitude does not exceed said predetermined threshold (step 11=NO) then a flag is set to zero (F0) and the procedure is restarted from the beginning (step 10), otherwise (step 11=YES)
- (step 12) checking whether a first cylinder i that generates the imbalance has already been identified at the previous recursion, and if it had been previously identified (step 12=YES), then
- (step 14) correcting an operating parameter of said first cylinder i;
- if instead the cylinder had not been corrected in the previous recursion (step 12=NO), then
- (step 13) (iib) calculating the phase of the half-order frequency (fi (f/2)) by identifying a second cylinder j;
- (step 15) checking whether said second cylinder j is a cylinder opposite—at less than 180°—a first cylinder i previously subjected to correction, and if the check is positive (step 15=YES), then
- (step 16) correcting an operating parameter of said first cylinder i, otherwise (step 15=NO) correcting (step 14) an operating parameter of the identified second cylinder j; then
- (step 17) second acquisition of a second time sample of the rotation speed signal of the drive shaft acquired after said correction (steps 14 or 16) and second calculation of a second amplitude A' of the half-order disturbance;
- (step 18) checking whether said second amplitude A' is lower than said first amplitude A; in the positive case (17=YES), then
- (step 19) maintaining an unchanged sign of said correction, setting to 1 the flag (F1) and starting again from the beginning (step 10), otherwise (step 17=NO)
- (step 20) inverting a sign of said correction, setting to 1 the flag (F1) and starting again from the beginning (step 10).

The use of the flag is convenient for detecting when a correction procedure on a cylinder is completed or evolving.

Therefore, when step 15 reports "first cylinder i previously subjected to correction", it means that its correction has been completed by setting the flag to zero.

According to the notation used, i=j or flag=1 represents a value assignment, while "==" represents a comparison.

Advance Control

Idling

When the disturbance detection procedure is performed at idle speed and the engine is a positive ignition engine, said change in the torque delivered by the cylinder i is obtained by correcting the ignition advance of the same cylinder as long as the engine is idling.

Therefore, this check is carried out integrally and exclusively as long as the engine is idling. Any correction of the operating parameters of the cylinders is cancelled by returning these parameters to their nominal values when the rotation speed of the engine exceeds a predetermined threshold such that the engine is not considered at idle speed.

Therefore, after the cylinder is identified, the advance is corrected to increase the torque delivered by the cylinder i and based on the obtained result the strategy continues a. (ix) by further correcting without varying the sign of correction;

b. (xiv) by inverting the sign of correction and correcting further;

as long as the amplitude of the half-order frequency is below the threshold Th.

Out of experience, the ignition advance is initially increased.

In any case, the present method allows checking whether the intervention is correct and in case inverting the correction sign.

In the event that a second cylinder j starts to deliver less torque, the strategy is also able to intervene on the second cylinder by correcting the delivered torque.

As previously stated, if the second cylinder j is opposite the first cylinder i, it is preferable to operate backwards, i.e. by inverting the sign of the last correction made on the cylinder i until the amplitude of the half-order frequency falls below the threshold Th.

Alternatively, all previous corrections can be cancelled and the analysis can be restarted from the beginning.

Constant and Higher Than Idling Rotation Speed

Another ideal condition to detect a torque delivery imbalance occurs when the angular speed of the drive shaft is higher than the idling speed and is averagely constant over a predetermined time range.

This time range must be long enough to allow the acquisitions necessary for steps 10 and 17.

This control strategy, unlike the previous one, can be performed under any operating condition of the internal combustion engine.

Moreover, this control strategy can be combined with the previous one, which instead must be actuated at idling speed. This means that at idling speed the previous control strategy prevails, whereas the present control strategy works at engine speeds higher than the idling speed.

When the internal combustion engine is a positive ignition engine and it is not possible to operate on the fuel injection since the post-treatment system of the exhausted gas does not allow it, then the advance of the cylinder i or of the relative opposite cylinder j and/or of the remaining cylinders may be gradually varied.

If it is possible to increase the advance on the cylinder i, then the procedure corrects the advance of the cylinder i both in positive and in negative, as in the previous example.

If, however, it is not possible to increase the advance on the cylinder i, because for example the engine calibration is already at the limit, then the procedure reduces the advance of the cylinder j opposite the cylinder causing the disturbance.

The diagram of FIG. 4 can therefore be modified to check whether the cylinder causing the disturbance has set the maximum advance. If so, the procedure reduces the advance of the opposite cylinder up to a certain reduction threshold.

Alternatively or in combination, it is possible to reduce the advance also on the remaining cylinders with respect to the cylinder i and j.

For example, the torque delivered by the cylinder no. 5 can be reduced by delta and the torque delivered by the remaining cylinders no. 2-no. 4, no. 6-no. 8 can be reduced by delta/h, where h is a parameter that can be calibrated, e.g. it can be equal to 2 or equal to the number N−1, where N represents the number of cylinders, which in the example is equal to 8.

For example, if the cylinder no. 1 (i) causes an imbalance, because for example it delivers less torque than the others, then the torque delivered by the cylinder no. 5 can be gradually reduced up to a certain reduction threshold.

Subsequently, the procedure operates on all the remaining cylinders by reducing their relative advance.

This not only reduces the amplitude of the imbalance, but also leads it to shift towards higher frequencies that are therefore more easily dampened.

It is clear that in a second correction procedure it may occur that the previously corrected cylinder no. 5 delivers less torque than the cylinder no. 1.

By starting the correction procedure its advance may be increased. In this case the procedure operates directly on the cylinder no. 5 and not on its opposite cylinder no. 1.

Therefore, with reference to FIG. 4, a further control can be introduced and as the cylinder to be corrected can be set the one that actually causes the disturbance i or its opposite j based on the advance value set on the cylinder i causing the disturbance, with respect to a relative predetermined maximum advance value.

Injection Control

The fuel injection control can be advantageously performed in diesel cycle internal combustion engines as there are no stringent restrictions in the stoichiometry of the combustion or in the positive ignition engines with an ATS that allows them to operate even in conditions of lean mixture.

This control strategy can be applied both at idling speed and at other rpms.

The fuel injection can be corrected by checking the fuel microinjections, their timing and/or the total mass of fuel injected at each combustion cycle in the cylinder i and/or in the remaining cylinders.

Since additive correction strategies can be implemented both at idling speed and at other rpms for each cylinder, then it is preferable to always operate on the cylinder i when the disturbance can be suppressed by increasing the delivered torque.

Regarding the identification of the cylinder causing the disturbance, also in this case one of the aforesaid options a) or b) is applied.

Therefore, when, following a first disturbance suppression, it should turn out that the same suppression is the cause of a consequent disturbance leading to the cylinder j opposite the previously corrected cylinder, then according to option b) the correction previously made to the fuel injection map of said cylinder is gradually reduced.

The present invention can be advantageously implemented by means of a computer program, which comprises coding means for implementing one or more steps of the method, when this program is run on a computer. Therefore, the scope of protection extends to said computer program and also to computer readable means comprising a recorded message, said computer readable means comprising program coding means for implementing one or more steps of the method when said program is run on a computer.

Modifications to the embodiments of the described non-limiting example are possible without departing from the scope of the present invention, including all the equivalent embodiments for a person skilled in the art.

From the above description, the person skilled in the art is able to manufacture the object of the invention without introducing further construction details. The elements and features illustrated in the various preferred embodiments, including the drawings, may be combined with each other without however departing from the scope of protection of the present application. What has been described in the part relating to the state of the art only provides a better understanding of the invention and does not represent a declaration of existence of what has been described. Furthermore, if not specifically excluded in the detailed description, what has been described in the part relating to the state of the art is to be considered as an integral part of the detailed description.

The invention claimed is:

1. An identification method of a torque delivery imbalance of an internal combustion engine equipped with two or more cylinders, under constant speed operating conditions of the internal combustion engine, comprising in succession the following steps:

(i) acquiring a first signal of a rotation speed of a relative drive shaft (CS) by means of a speed sensor;

(ii) converting the rotation speed of said first signal at the constant speed into a second signal by Fourier transformation, the second signal defined by a predetermined frequency (f) in the frequency domain that corresponds to the rotation speed of the first signal, and (iia) calculating a first amplitude (A=Re(f/2)) of the predetermined frequency (f/2) equal to half a frequency (f) corresponding to said constant speed;

(iii) comparing said first amplitude (A) with a predetermined threshold (Th) and if said first amplitude exceeds said predetermined threshold, then (iv) an imbalance of the internal combustion engine has been identified.

2. The method according to claim 1, further comprising an identification procedure of a first cylinder (i) of said two or more cylinders that causes imbalance, said procedure comprising the following steps:

(iib) calculating a first phase (fi(f/2)) relative to the first amplitude (Re(f/2)) with respect to a reference phase (f(0));

(v) preliminary dividing a plane into angular sectors in numbers corresponding to a number (N) of said two or more cylinders and numbering said sectors consecutively according to an ignition order of said internal combustion engine starting from a reference phase (0);

(vi) identifying said first cylinder (i) that causes said imbalance by identifying a corresponding sector (i) to which said first phase (fi(f/2)) belongs.

3. A suppression method of a torque delivery imbalance of an internal combustion engine comprising a preliminary procedure for identifying a first cylinder (i) causing said imbalance according to claim 2 and further comprising a correction (ix) according to one of the following three options:

(ixa) applying a first correction of an operating parameter said first cylinder (i), or (ixb) applying a second correction of an operating parameter to a second cylinder (j) opposite said first cylinder, or (ixc) applying a third correction to an operating parameter of the remaining cylinders with respect to said first cylinder (i) such that the selected one of the three options provides even distribution of torque for the two or more cylinders.

4. The method according to claim 3, further comprising the following steps in succession:

(xi) acquiring a second signal of said rotation speed of a relative drive shaft (CS) by means of a speed sensor;

(xii) converting said second signal into a second signal in the frequency domain, (xiia) calculating a second amplitude (A'=Re(f/2)) of said predetermined frequency;

(xiii) comparing said first amplitude (A) with said second amplitude (A') and if said second amplitude exceeds said first amplitude, then (xiv) inverting a sign of said correction and carrying out said first, second or third correction of said parameter, or, if said first amplitude exceeds said second amplitude, then (ix) carrying out said first, second or third correction of said parameter.

5. The suppression method according to claim 3, further comprising a storing step (x) of a last previous correction (ix) correlating said first cylinder (i);

said first or second or third correction (ixa, ixb, ixc);

said sign of said last correction.

6. The suppression method according to claim 5, wherein when it is found that a second cylinder (j) causes said imbalance and when it is found that a first cylinder opposite said second cylinder had been previously identified and subjected to a first correction, then the method comprises a step of (xiv) inverting a sign of said last correction and (ix) correcting said parameter relative to said first cylinder according to claim 3.

7. The suppression method according to claim 3, wherein said operating parameter is an ignition advance when said internal combustion engine is a positive ignition engine.

8. The suppression method according to claim 3, wherein said constant speed operating conditions coincide with the idling speed and wherein said internal combustion engine is a positive ignition engine and wherein said suppression is carried out by means of said first positive or negative correction of said ignition advance.

9. The suppression method according to claim 1, wherein said constant speed operating conditions of the internal combustion engine coincide with a speed higher than the idling speed and wherein said internal combustion engine is a positive ignition engine and wherein said suppression is carried out by means of said second or third positive or negative correction of said ignition advance.

10. The suppression method according to claim 3, wherein said operating parameter refers to a fuel injection in terms of number and timing of relative injections and of overall mass of injected fuel or wherein said operating parameter refers to the overall mass of the injected fuel.

11. A computer program that comprises program coding means designed to implement the steps of claim 1, when said program is run on a computer.

12. Computer readable means comprising a stored program, said computer readable means comprising program coding means designed to implement the steps of claim 1, when said program is run on a computer.

13. An identification device of a torque delivery imbalance of an internal combustion engine equipped with two or more cylinders, under constant speed operating conditions of the internal combustion engine, comprising:

a processing unit (ECU), operatively connected with a sensor (S) designed to acquire a rotation speed of said internal combustion engine and configured to carry out in succession the following steps:

(i) acquiring a first signal of a rotation speed of a relative drive shaft (CS) by means of a speed sensor;

(ii) converting the rotation speed of said first signal at the constant into a second signal by Fourier transformation, the second signal defined by a predetermined frequency (f) in the frequency domain that corresponds to the rotation speed of the first signal, and (iia) calculating a first amplitude (A=Re(f/2)) of a predetermined frequency equal to half a frequency relative to said constant speed;

(iii) comparing said first amplitude with a predetermined threshold (Th) and if said first amplitude exceeds said predetermined threshold, then (iv) an imbalance of the internal combustion engine has been identified.

14. The device according to claim 13, wherein said processing unit is further configured to carry out an identification procedure of a first cylinder (i) of said two or more cylinders that causes said imbalance, wherein said processing unit is configured to carry out the following steps:

(iib) calculating a first phase (fi(f/2)) relative to said first amplitude (A=Re(f/2)) with respect to a reference phase (0);

preliminary dividing a plane into angular sectors in numbers corresponding to a number (N) of said two or more cylinders and numbering said sectors consecutively according to an ignition order of said internal combustion engine starting from a reference phase (f(0));

(vi) identifying said first cylinder that causes said imbalance by identifying a corresponding sector (i) to which said first phase (fi(f/2)) belongs.

15. The suppression device of a torque delivery imbalance of an internal combustion engine comprising an identification device of a torque delivery imbalance of an internal combustion engine according to claim 14, wherein said device is further configured to carry out a correction (ix) according to one of the following three options:

(ixa) applying a first correction of an operating parameter of said first cylinder, or (ixb) applying a second correction of an operating parameter of a second cylinder (j) opposite said first cylinder, or (ixc) applying a third correction of an operating parameter of the remaining cylinders with respect to said first cylinder such that the selected one of the three options provides even distribution of torque for the two or more cylinders.

16. The device according to claim 15, further configured to carry out the following steps in succession:

(xi) acquiring a second signal of said rotation speed of a relative drive shaft (CS) by means of a speed sensor;

(xii) converting said second signal into a second signal in the frequency domain, (xiia) calculating a second amplitude (A'=Re(f/2)) of said predetermined frequency;

(xiii) comparing said first amplitude with said second amplitude and if said second amplitude exceeds said first amplitude, then (xiv) inverting a sign of said correction and carrying out said first, second or third correction of said parameter, or, if said first amplitude exceeds said second amplitude, then (ix) carrying out said first, second or third correction of said parameter.

17. The device according to claim 16, wherein said processing unit is configured so that when it is found that a second cylinder (j) causes said imbalance and when it is found that a first cylinder opposite said second cylinder had been previously identified and subjected to a first correction, then the method comprises the step of:

(xiv) inverting a sign of said last correction and (ix) correcting said parameter relative to said first cylinder according to claim 3.

18. The suppression device according to claim 14, wherein said internal combustion engine comprises an ignition controlling circuitry (C) and wherein said operating parameter is an ignition advance operated by said circuitry.

19. The suppression device according to claim 14, wherein said constant speed operating conditions coincide with the idling speed, wherein said internal combustion engine is a positive ignition internal combustion engine and wherein said device is configured to carry out said suppression by means of said first positive or negative correction of said ignition advance.

20. The suppression device according to claim 15, wherein said constant speed operating conditions of the internal combustion engine coincide with a speed higher than an idling speed and wherein said internal combustion engine is a positive ignition engine and wherein said suppression is carried out by means of said second or third positive or negative correction of said ignition advance.

21. The suppression device according to claim 14, wherein said internal combustion engine comprises a fuel injection system designed to selectively control mode and overall mass of fuel injected in each single cylinder of said two or more cylinders, and wherein said operating parameter refers to a fuel injection in terms of mode and/or timing and overall mass of fuel injected in each combustion cycle or wherein said operating parameter refers to the overall mass of the injected fuel.

22. A road vehicle equipped with an internal combustion engine (E) comprising two or more cylinders and characterised in that it comprises an identification device according to claim 13 of a torque delivery imbalance of said internal combustion engine under constant speed operating conditions and a suppression device of said imbalance according to claim 15.

* * * * *